United States Patent
Scarpantoni et al.

(10) Patent No.: US 11,829,791 B2
(45) Date of Patent: Nov. 28, 2023

(54) PROVIDING DEVICE ABSTRACTIONS TO APPLICATIONS INSIDE A VIRTUAL MACHINE

(71) Applicant: Microsoft Technology Licensing, LLC, Redmond, WA (US)

(72) Inventors: Alessandro Domenico Scarpantoni, Redmond, WA (US); Shyamal Kaushik Varma, Issaquah, WA (US); Ajay Preetham Barboza, Woodinville, WA (US); Jason Christopher Knichel, Seattle, WA (US); Adam Joseph Lenart, Seattle, WA (US); Samuel David Adams, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 506 days.

(21) Appl. No.: 16/706,546

(22) Filed: Dec. 6, 2019

(65) Prior Publication Data

US 2021/0173686 A1  Jun. 10, 2021

(51) Int. Cl.
*G06F 9/455*    (2018.01)
*G06F 21/53*    (2013.01)

(52) U.S. Cl.
CPC ...... *G06F 9/45558* (2013.01); *G06F 9/45545* (2013.01); *G06F 21/53* (2013.01); *G06F 2009/45579* (2013.01); *G06F 2009/45583* (2013.01); *G06F 2009/45587* (2013.01)

(58) Field of Classification Search
CPC ............... G06F 9/45558; G06F 21/53; G06F 2009/45579
See application file for complete search history.

(56) References Cited

U.S. PATENT DOCUMENTS

| | | | |
|---|---|---|---|
| 7,581,229 B2 | 8/2009 | Watkins et al. | |
| 2006/0206904 A1* | 9/2006 | Watkins | G06F 9/45537 719/321 |
| 2009/0043921 A1* | 2/2009 | Roy | G06F 13/385 710/31 |

(Continued)

OTHER PUBLICATIONS

"International Search Report and Written Opinion Issued in PCT Application No. PCT/US2020/059242", dated Feb. 23, 2021, 12 Pages.

(Continued)

*Primary Examiner* — Dong U Kim
(74) *Attorney, Agent, or Firm* — RAY QUINNEY & NEBEKER; Tiffany Healy

(57) ABSTRACT

The present disclosure relates to devices and methods for creating one or more proxy devices in a guest device mirroring the devices hosted by a host device. The proxy devices may provide full device access functionality to applications running in the guest device. The devices and methods may load a proxy driver inside the guest device, which communicates with the host device. When applications running on the guest device interact with the proxy devices, the proxy driver communicates the interaction to the host device, which communicates with the device driver managing the device. The devices and methods allow applications running on the host and applications running on the guest to shares access to the same device.

20 Claims, 7 Drawing Sheets

(56) References Cited

U.S. PATENT DOCUMENTS

| | | | | |
|---|---|---|---|---|
| 2009/0276551 A1* | 11/2009 | Brown | .................. | G06F 13/102 |
| | | | | 710/72 |
| 2016/0315922 A1* | 10/2016 | Chew | .................... | H04L 63/061 |
| 2018/0268146 A1* | 9/2018 | Suryanarayana | ..... | G06F 21/445 |
| 2020/0053084 A1* | 2/2020 | Vajravel | .................. | H04L 63/10 |
| 2020/0334058 A1* | 10/2020 | Chan | .................. | G06F 9/45545 |
| 2021/0089480 A1* | 3/2021 | Chan | .................. | G06F 9/45545 |

OTHER PUBLICATIONS

"Office Action Issued in European Patent Application No. 20817130.6", dated Apr. 12, 2023, 5 Pages.
"Office Action Issued in European Patent Application No. 20817130.6", dated May 10, 2023, 5 Pages.

* cited by examiner

PROVIDING DEVICE ABSTRACTIONS TO APPLICATIONS INSIDE A VIRTUAL MACHINE

BACKGROUND

Virtual machines may allow concurrent operation of two or more full operating systems on a single computer system. Virtual machines are useful as they allow instances of a full operating system (and accompanying software) to be isolated from the hardware. Thus, virtual machines may provide many security and compatibility benefits. However, due to this isolation, software running inside a virtual machine cannot typically access devices, real or otherwise, attached to the operating system which is hosting the virtualized operating system.

These and other problems exist regarding accessing devices from software running inside virtual machines.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a computer device. The computer device may include at least one memory to store data and instructions, at least one processor, and a host device in communication with the memory and the at least one processor, wherein the host device hosts a guest device operable to: receive, from the host device, a notification with information for at least one device in communication with the host device; use the information for the at least one device to generate a proxy device that mirrors the at least one device in the guest device; and load a redirection driver for the proxy device to communicate with the host device in response to determining that the proxy device supports input/output redirection.

One example implementation relates to a method executed on computer device with a host device in communication with a guest device. The method may include receiving, from the host device, a notification with information for at least one device in communication with the host device. The method may include using the information for the at least one device to generate, in the guest device, a proxy device that mirrors the at least one device in the guest device. The method may include loading, in the guest device, a redirection driver for the proxy device to communicate with the host device in response to determining that the proxy device supports input/output redirection.

Another example implementation relates to a computer-readable medium storing instructions executable by a computer device. The computer-readable medium may include at least one instruction for causing the computer device to receive, from a host device, a notification with information for at least one device in communication with the host device. The computer-readable medium may include at least one instruction for causing the computer device to receive use the information for the at least one device to generate a proxy device that mirrors the at least one device in a guest device. The computer-readable medium may include at least one instruction for causing the computer device to load a redirection driver for the proxy device to communicate with the host device in response to determining that the proxy device supports input/output redirection.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

Figure 1:
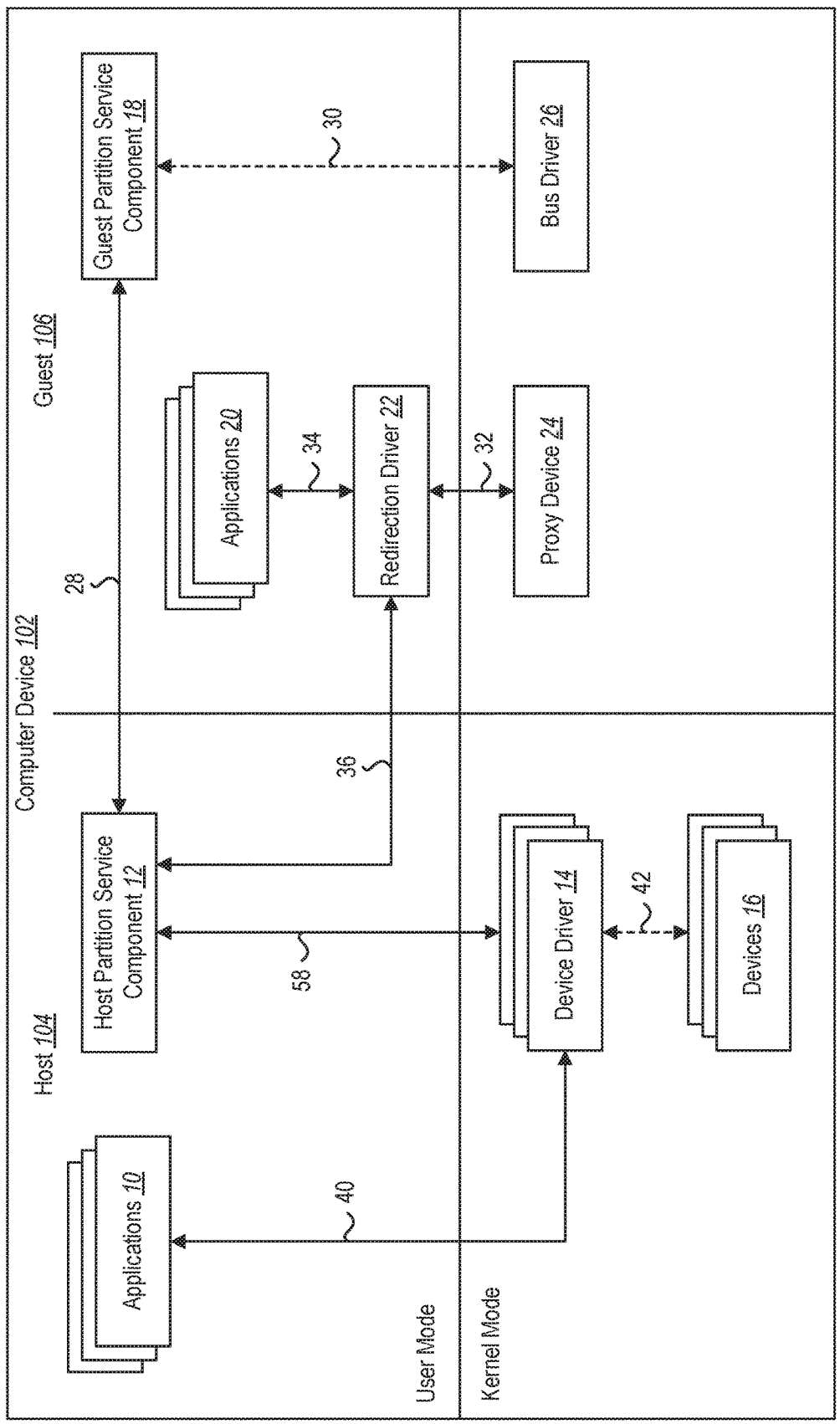
FIG. 1 is a schematic block diagram of an example computer device for use with providing device abstractions in accordance with an implementation of the present disclosure.

This disclosure generally relates to devices and methods for allowing an instance of an operating system (OS) running inside a virtual machine ("the guest OS") to transparently observe and access certain hardware or software device abstractions actually managed by an instance of an operating system hosting the virtual machine ("the host OS"). Software running inside a virtual machine cannot typically access devices, real or otherwise, attached to the operating system which is hosting the virtualized operating system.

The present disclosure may provide a pair of operating system components (services), one in the guest (e.g., a guest partition service component), and one in the host (e.g., a host partition service component), to communicate across the virtual machine boundary. For example, the guest partition service component and the host partition service component may communicate using OS primitives to share the state of reflected devices.

The present disclosure may provide device abstractions that appear to software running inside the guest to be local to the guest. The device abstractions may mirror the devices hosted by the host in the guest. The device abstractions may provide full device access functionality to software running in the guest. As such, existing software running inside a virtual machine may interact with the device abstractions and have full device access functionality to devices hosted by the host device, without requiring any changes to existing software.

The host partition service component may provide the guest partition service component with device metadata (e.g., device properties and/or a session identification (ID)) for one or more devices hosted by the host. The host partition service component may provide the device metadata for all devices hosted by the host. In addition, the host partition service component may select a subset of the devices hosted by the host device to project into the guest device and may send the device metadata for the subset of devices. For example, the host partition service component may apply one or more rules or heuristics to select the subset of devices.

The guest partition service component may receive the device metadata and may create one or more proxy devices in the guest mirroring the devices hosted by the host. For example, duplicate devices may be created inside the guest representative of devices on the host and may have the same metadata (e.g., device properties) on the guest as on the host. The guest partition service component may apply one or more rules in determining whether to create a proxy device in the guest device. The devices from the host may be projected into a plurality of guest devices. As such, a single device may be accessed via the host and one or more guests.

A proxy driver may be loaded on the device representation inside the guest, which communicates with the service in the host (e.g., the host partition service component). The proxy driver may be a redirection driver associated with the proxy device. When software in the guest attempts to interact with the device representation inside the host, the proxy driver communicates the interaction to the host partition service component, which communicates with the device driver managing the device representation on the host. Neither the application in the guest or the device driver on the host may be aware that the device communication is crossing the virtual machine boundary, and neither component requires changes to support the virtual machine communications.

Existing solutions that allow applications on virtual machines to access devices typically provide redirection at a much lower level, requiring exclusive ownership of the entire device to be handed over to the guest operating system. As such, software running on the host and software running in the guest may be unable to concurrently access the hardware.

The present disclosure may coordinate the use of the devices between applications operating on the host device and applications operating on the guest device. The device driver on the host device may be unaware of whether the requests for device access originated from an application running on the host device or an application running on a guest device and may provide both applications access to the device.

As such, the present disclosure includes several practical applications that provide benefits and/or solve problems associated with providing applications running on the guest access to devices. The present disclosure allows applications running on the host and applications running on the guest to shares access to the same device. The present disclosure also allows for software running inside the virtual machine to be capable of coexisting with software running natively on the host. As such, devices may be simultaneously available for use by applications running on the host while also projected and accessible by applications in multiple guest devices.

Referring now to FIG. 1, illustrated is an example computer device 102 for use with providing device abstractions of devices 16 in communication with computer device 102. Computer device 102 may include a host device 104 with an operating system ("the host OS") hosting one or more guest devices 106 that include an instance of an operating system ("the guest OS") running inside the guest devices 106. Guest devices 106 may include, for example, a virtual machine. Guest devices 106 may emulate a separate computer system.

Computer device 102 may also refer to various types of computing devices. For example, the computer device 102 may include a mobile device such as a mobile telephone, a smart phone, a personal digital assistant (PDA), a tablet, or a laptop. Additionally, or alternatively, the computer device 102 may include one or more non-mobile devices such as a desktop computer, server device, or other non-portable device. In one or more implementations, the computer device 102 refers to dedicated gaming devices (e.g., handheld gaming devices) in communication with a display device. In one or more implementations, the computer device 102 refers to a game console in communication with remote servers or computing devices. In one or more implementations, the computer device 102 includes graphical user interfaces thereon (e.g., a screen of a mobile device). In addition, or as an alternative, computer device 102 may be communicatively coupled (e.g., wired or wirelessly) to a display device having a graphical user interface thereon for providing a display of gaming content. Computer device 102 may include features and functionality described below in connection with FIG. 7.

Host device 104 may communicate with and/or manage one or more devices 16 in communication with computer device 102. Devices 16 may include, but are not limited to, Plug and Play (PnP) devices. Device abstractions of devices 16 may be projected into one or more guest devices 106 so that applications 20 operating on guest devices 106 may discover and/or communicate with one or more devices 16 hosted by host device 104. The device abstractions may mirror or otherwise represent devices 16 hosted by host device 104 in guest devices 106. In addition, the device abstractions may provide full device access functionality to guest devices 106.

Host device 104 may include a host partition service component 12 that sends a notification to a guest partition service component 18 with information about one or more devices 16 managed by host device 104. The information may include device metadata. The device metadata may include a session ID and device properties, such as, but not limited to, a device ID, hardware make, model, and/or identity. The notification may be sent over a communication channel 28 across the virtual machine boundary using OS primitives to share the state of devices 16.

In an implementation, host partition service component 12 may apply one or more rules or heuristics to determine whether to provide guest partition service component 18 with information for devices 16. For example, the rules or heuristics may identify one or more supported device types (e.g., Universal Serial Bus (USB), human interface devices, and/or serial devices) for providing information to guest device 106. For example, after a USB device is connected to computer device 102, host partition service component 12 may determine that USB is a supported device type or class and may send a notification to guest partition service component 18 with information for the USB device. Another example of the rules or heuristics may include a list of devices to project into guest device 106 (e.g., an operating system specific camera, speakers, headset, or game controllers) or a list of devices to skip the projection into guest device 106 (e.g., chipsets). Another example of the rules or heuristics may include devices 16 opting in or opting out of projection into guest device 106. Thus, instead of providing guest partition service component 18 with information for all devices 16 hosted by host device 104, host partition service component 12 may provide information to guest partition service component 18 for a subset of devices 16 hosted by host device 104.

Host device 104 may also monitor the addition and/or removal of devices 16. As new devices 16 are added to computer device 102, host partition service component 12 may send the notification to notify guest partition service component 18 of the availability of the new device 16. In addition, as devices 16 are removed from computer device 102, host partition service component 12 may send the notification to notify guest partition service component 18 of the unavailability of device 16. Host partition service component 12 may monitor the coming and going of devices 16 available to host device 104 and may provide guest partition service component 18 with updated information regarding devices 16.

Guest partition service component 18 may receive the notification with information about one or more devices 16. The information may include device metadata. The device metadata may include a session ID and device properties, such as, but not limited to, a device ID, hardware make, model, and/or identity.

Guest partition service component 18 may send a device abstraction request 30 to bus driver 26 to generate one or more proxy devices 24 corresponding to device 16. Bus driver 26 may create the proxy devices 24 for guest device 106. Proxy devices 24 may be duplicate devices that represent or mirror devices 16 on guest device 106. Proxy devices 24 may also include the same or similar device metadata (e.g., device properties) on guest device 106 as on host device 104. The device metadata may be used to map proxy device 24 to the corresponding device 16. Device 16 may be projected into a plurality of guest devices 106. Each guest device 106 may have a corresponding proxy device 24 for device 16. In addition, guest device 106 may have a plurality of proxy devices 24 corresponding to different devices 16.

In an implementation, guest partition service component 18 may apply one or more rules or heuristics in determining whether to create a proxy device 24 for a device 16. For example, the rules or heuristics may identify compatible devices for applications 20 executing on guest device 106. The rules or heuristics may also identify one or more supported device types or classes. Another example of the rules or heuristics may include a list of devices to abstract or a list of devices to skip. Thus, instead of creating proxy devices 24 corresponding to all devices 16 guest partition service component 18 received information regarding, guest partition service component 18 may generate proxy devices 24 corresponding to a subset of the devices 16.

Bus driver 26 may also load one or more redirection drivers 22 for proxy devices 24. Bus driver 26 may determine whether proxy device 24 supports input/output (I/O) operations and/or redirection. Bus driver 26 may load a redirection driver 22 for proxy device 24 in response to determining that proxy device 24 supports I/O redirection. Redirection driver 22 may have a communication path 32 with proxy device 24. In addition, Redirection driver 22 may communicate with host partition service component 12 and may transmit the I/O requests (e.g., read to a device, write to a device, have a device perform an operation) received to host partition service component 12 instead of sending the I/O requests to proxy device 24. By loading redirection driver 22, a communication path 36 or vector may be established so that interactions may occur across the virtual machine boundary with the corresponding device 16 for the proxy device 24.

Alternatively, proxy device 24 may be presented without a redirection driver 22 in response to bus driver 26 determining that proxy device 24 does not support I/O redirection. As such, applications 20 running in guest device 106 may discover the proxy device 24 but may be unable to use the proxy device 24 for I/O requests. For example, the proxy device 24 may mirror a Bluetooth device accessible by the host device 104. Applications 20 running in guest device 106 may use the proxy device 24 of the Bluetooth device but may be unable to perform I/O operations on proxy device 24.

Proxy devices 24 may appear to applications 20 running inside guest device 106 to be local to guest device 106. As such, existing applications 20 that interact with device abstractions may run inside a virtual machine (e.g., guest device 106) with full device 16 access functionality, without requiring any changes to the existing applications 20.

Application 20 running in guest device 106 may want to use one or more proxy devices 24 for one or more I/O requests. Application 20 may review the device metadata associated with the proxy devices 24 available on guest device 106 to identify one or more proxy devices 24 to use for the I/O requests. For example, application 20 may select a proxy device 24 with device metadata indicating that the proxy device 24 is a compatible video camera for application 20.

Application 20 may create a handle to the selected proxy device 24. The handle may establish a communication path 34 between application 20 and redirection driver 22. In an implementation, a device interface may be used to create the handle to proxy device 24 allowing application 20 to use proxy device 24. Application 20 may use the handle to send one or more I/O requests for proxy device 24 to perform.

Redirection driver 22 may receive the I/O request and may redirect the I/O requests to host partition service component 12. The I/O request may include request metadata, such as, but not limited to, application information, user identity, device information, and/or guest device information. Host partition service component 12 may use the request metadata to identify the corresponding device 16 for the selected proxy device 24 and may open a handle to device driver 14 associated with the identified device 16. The handle may create a communication path 58 between host partition service component 12 and device driver 14. Host partition service component may use communication path 58 to transmit the I/O requests to device driver 14.

In an implementation, host partition service component 12 may perform an access control to device 16. Host partition service component 12 may use the request metadata information associated with the I/O request to determine whether to provide guest device 106 and/or application 20 access to device 16 for the I/O request. For example, an operating system specific web camera may allow guest access to the web camera when the guest application is an operating system specific application. Host partition service component 12 may use the request metadata to perform a verification that application 20 is the operating specific application prior to sending the I/O request to device driver 14. Another example may include a device that may have an access policy from guest applications based on guest container type (e.g., allow access from applications within a virtual machine (VM) container providing compatibility with other operating systems and block access from applications within a more secure locked-down VM contain).

Host partition service component 12 may use the request metadata to perform a verification that the guest device 106 is an allowed container type before transmitting the I/O request to device driver 14. Another example may include requiring user consent for an application to access device 16. For example, if a sandbox application sent an I/O request to access device 16, user consent may be required before allowing the sandbox application access to device 16. The access control to device 16 may also be performed by device driver 14. For example, device driver 14 may apply one or more rules to determine whether to provide the guest device 106 and/or applications 20 access to device 16.

Device driver 14 may coordinate use of devices 16. Device driver 14 may receive requests from one or more applications 10 operating on host device 104 to use, or otherwise access, one or more devices 16. For example, applications 10 may open a handle, or other communication path 40, to device driver 14 to send device driver 14 one or more requests for device 16. Device driver 14 may also receive one or more requests from host partition service component 12 to use, or otherwise access, devices 16. As such, device driver 14 may be unaware of whether the requests originated from an application 10 running on host device 104 or an application 20 running on a guest device 106 and may provide access to device 16 to both applications 10 and applications 20. Devices 16 may be simultaneously available for use by applications 10 running on host device 104 while also projected and accessible by applications 20 in multiple guest devices 106.

For example, a conference application running on guest device 106 may open a headset for use with the conference application. A game application running on host device 104 may also want to use the headset. When the conference application is finished with the headset, device driver 14 may switch the use of the headset from the conference application running on the guest device 106 to the game application running on the host device 104. As such, the headset may be available for use by both the conference application running on host device 104 and the game application running on guest device 106.

Device driver 14 may transmit the requests (e.g., requests from applications 10 and/or I/O requests from host partition service component 12) to device 16, for example, via a communication path 42. Device 16 may perform one or more operations in response to the requests and may provide a response to the requests. Device driver 14 may communicate the response to applications 10 and/or host partition service component 12.

Host partition service component 12 may send the response to redirection driver 22 and redirection driver 22 may send the response to application 20. Application 20 may be unaware that the response came from device 16 accessed by host device 104. Moreover, application 20 may access device 16 from guest device 106 without modifications or changes to application 20. For example, legacy applications may be able to run in a virtual environment (e.g., guest device 106) and may discover and use customized or specialized hardware for the legacy applications without requiring changes to the applications.

As such, computer device 102 may allow applications 10 running on host device 104 and applications 20 running on guest device 106 to share the usage of devices 16 providing flexibility in moving applications between host device 104 and guest device 106.

Figure 2:
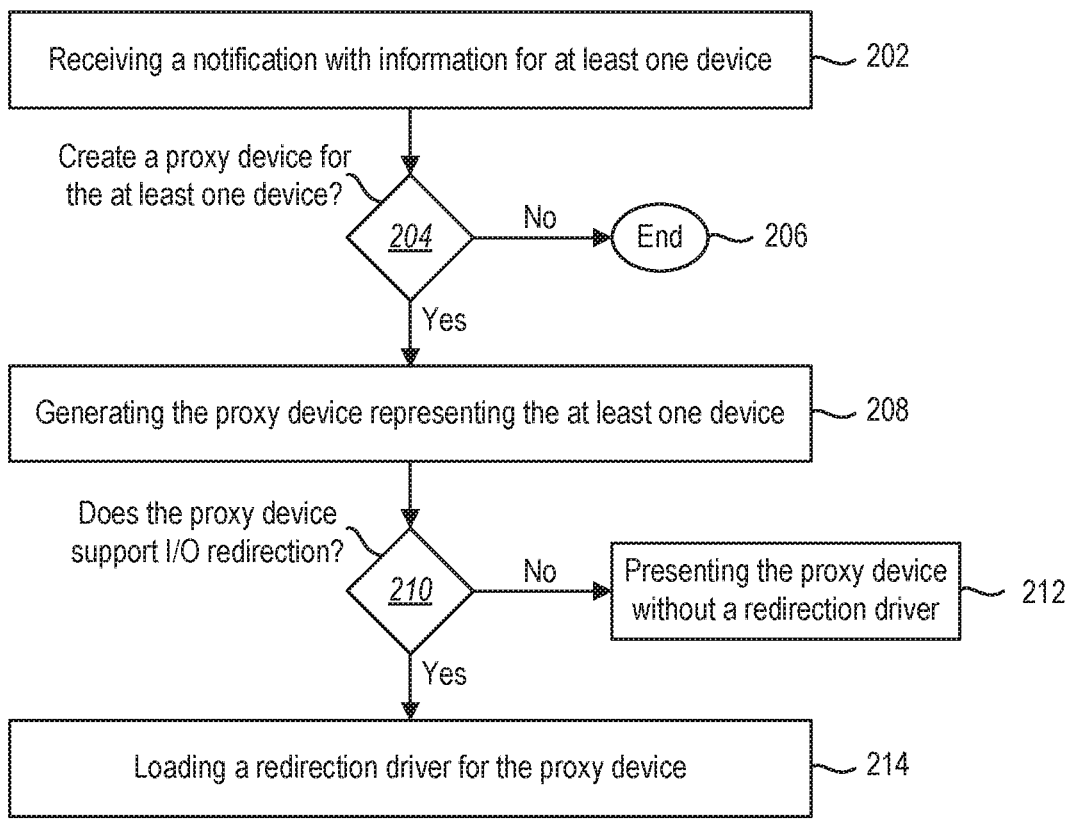
FIG. 2 is a flow diagram of an example method for creating device abstractions in accordance with an implementation.

Referring now to FIG. 2, an example method 200 may be used by guest device 106 (FIG. 1) to create device abstractions mirroring devices 16 (FIG. 1) hosted by host device 104. The actions of method 200 may be discussed below with reference to the architecture of FIG. 1.

At 202, method 200 may include receiving a notification with information for at least one device. Guest partition service component 18 may receive a notification from host partition service component 12 with information about one or more devices 16 hosted by host device 104. The information may include device metadata, including a session ID and device properties. Device properties may include, but are not limited to, a device ID, hardware make, model, and/or identity. The notification may be sent over a communication channel 28 across the virtual machine boundary using OS primitives to share the state of devices 16.

In an implementation, host partition service component 12 may apply one or more rules or heuristics to determine whether to provide guest partition service component 18 with information for devices 16. For example, the rules or heuristics may identify one or more supported device types or classes. Another example of the rules or heuristics may include a list of devices to project into guest device 106 or a list of devices to skip the projection of into guest device 106. Another example of the rules or heuristics may include devices 16 opting in or opting out of projection into guest device 106. Thus, instead of providing guest partition service component 18 with information for all devices 16 hosted by host device 104, host partition service component 12 may provide information to guest partition service component 18 for a portion of devices 16 hosted by host device 104.

At 204, method 200 may include determining whether to create a proxy device for the at least one device. Guest partition service component 18 may apply one or more rules or heuristics in determining whether to create a proxy device 24 for a device 16. For example, the rules or heuristics may identify compatible devices for applications 20 executing on guest device 106. The rules or heuristics may also identify one or more supported device types or classes. Another example of the rules or heuristics may include a list of devices to abstract or a list of devices to skip the device abstraction. Thus, instead of creating proxy devices 24 corresponding to all devices 16 that guest partition service component 18 received information for, guest partition service component 18 may create proxy devices 24 corresponding to a subset of the devices 16.

At 206, method 200 may end in response to guest partition service component 18 determining to skip the creation of a proxy device 24 for the at least one device 16.

At 208, method 200 may include generating the proxy device representing the at least one device. Guest partition service component 18 may send a device abstraction request 30 to bus driver 26 to generate one or more proxy devices 24 corresponding to device 16. Bus driver 26 may create the proxy devices 24 for guest device 106. Proxy devices 24 may be duplicate devices that represent or mirror devices 16 on guest device 106. Proxy devices 24 may also include the same or similar device metadata (e.g., device properties) on guest device 106 as on host device 104. The device metadata may be used to map proxy device 24 to the corresponding device 16. Device 16 may be projected into a plurality of guest devices 106. Each guest device 106 may have a corresponding proxy device 24 for device 16. In addition, guest device 106 may have a plurality of proxy devices 24 corresponding to different devices 16.

At 210, method 200 may include determining whether the proxy device supports input/output redirection. Bus driver 26 may determine whether proxy device 24 supports input/output (I/O) operations and/or redirection.

At 212, method 200 may include presenting the proxy device without a redirection driver. Proxy device 24 may be presented without a redirection driver 22 in response to bus driver 26 determining that proxy device 24 does not support I/O redirection. As such, applications 20 running in guest device 106 may discover the proxy device 24 but may be unable to use the proxy device 24 for I/O requests. For example, the proxy device 24 may mirror a Bluetooth device accessible by the host device 104. Applications 20 running in guest device 106 may use the proxy device 24 of the Bluetooth device but may be unable to perform I/O operations on proxy device 24.

At 214, method 200 may include loading a redirection driver for the proxy device. Bus driver 26 may also load one or more redirection drivers 22 for proxy devices 24. Bus driver 26 may load a redirection driver 22 for proxy device 24 in response to determining that proxy device 24 supports I/O redirection. Redirection driver 22 may communicate with host partition service component 12 and may transmit the I/O requests received to host partition service component 12 instead of sending the I/O requests to proxy device 24. By loading redirection driver 22, a communication path or vector may be established so that interactions may occur across the virtual machine boundary with the corresponding device 16 for the proxy device 24.

Method 200 may be used to create one or more proxy devices 24 in guest device 106 that mirror devices 16 hosted by host device 104. Proxy devices 24 may appear to applications 20 running inside guest device 106 to be local to guest device 106. As such, the device abstractions may run inside guest device 106 providing applications running on guest device 106 with full device 16 access functionality, without requiring any changes to the existing applications 20.

Figure 3:
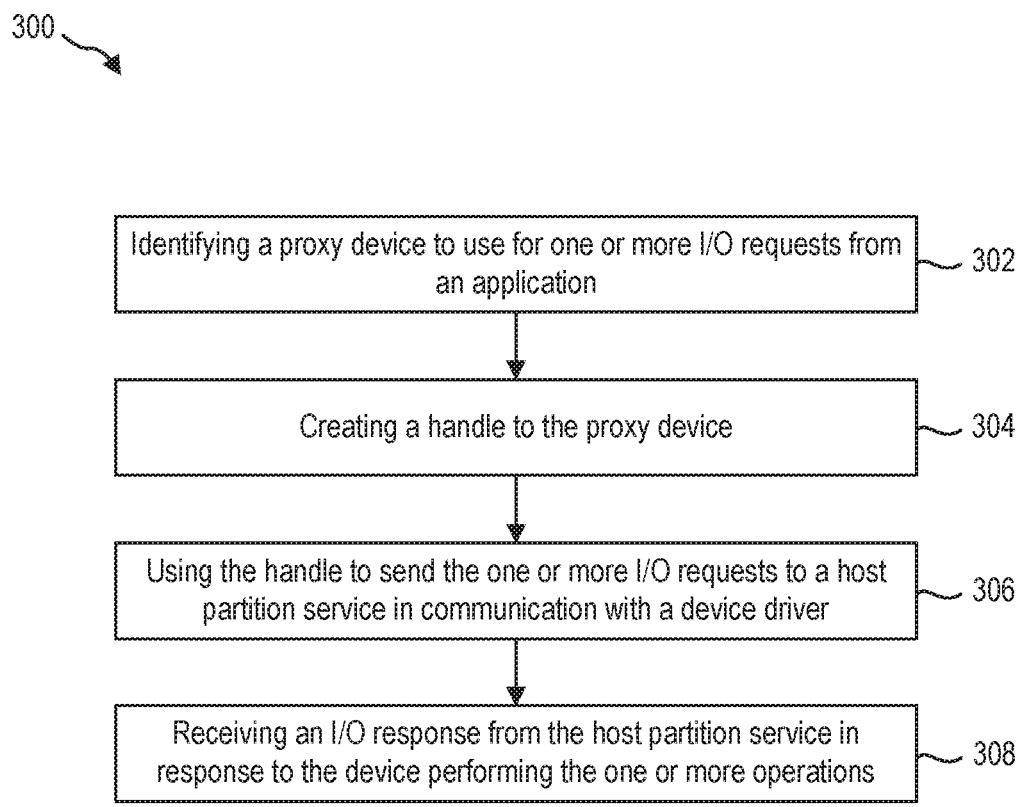
FIG. 3 is a flow diagram of an example method for using a device abstraction for one or more requests in accordance with an implementation.

Referring now to FIG. 3, an example method 300 may be used by guest device 106 (FIG. 1) to allow an application running on guest device to use a device abstraction for one or more requests. The actions of method 300 may be discussed below with reference to the architecture of FIG. 1.

At 302, method 300 may include identifying a proxy device to use for one or more input/output requests from an application. Application 20 running in guest device 106 may want to use one or more proxy devices 24 for one or more I/O requests. Application 20 may review the device metadata associated with the proxy devices 24 available on guest device 106 to identify one or more proxy devices 24 to use. For example, application 20 may select a proxy device 24 with device metadata indicating that the proxy device 24 is a compatible video camera for application 20.

At 304, method 300 may include creating a handle to the proxy device. Application 20 may create a handle to the selected proxy device 24. Application 20 may use the handle to communicate with or use proxy device 24. In an implementation, a device interface may be used to create the handle to proxy device 24 and may allow application 20 to use proxy device 24.

At 306, method 300 may include using the handle to send the one or more input/output requests to a host partition service in communication with a device driver. Application 20 may use the handle to send one or more I/O requests to proxy device 24. Redirection driver 22 may receive the I/O request from application 20 and may send the I/O requests to host partition service component 12. The I/O request may include request metadata, such as, but not limited to, application information, user identity, device information, and/or guest device information.

Host partition service component 12 may use the request metadata to identify the corresponding device 16 for the selected proxy device 24 and may open a handle to device driver 14 associated with the identified device 16. Host partition service component may transmit the I/O requests to device driver 14.

At 308, method 300 may include receiving an input/output response from the host partition service in response to the device performing the one or more operations. Device 16 may perform one or more operations in response to the input/output requests and may provide an input/output response. Device driver 14 may communicate the input/output response to host partition service component 12. Host partition service component 12 may send the response to redirection driver 22 and redirection driver 22 may send the input/output response to application 20. Application 20 may be unaware that the response came from device 16 accessed by host device 104.

As such method 300 may allow applications 20 operating on guest device 106 access to devices 16 without modifications or changes to applications 20. For example, legacy applications may be able to run on guest device 106 and may discover and use customized or specialized hardware for the legacy applications without requiring changes to the applications.

Figure 4:
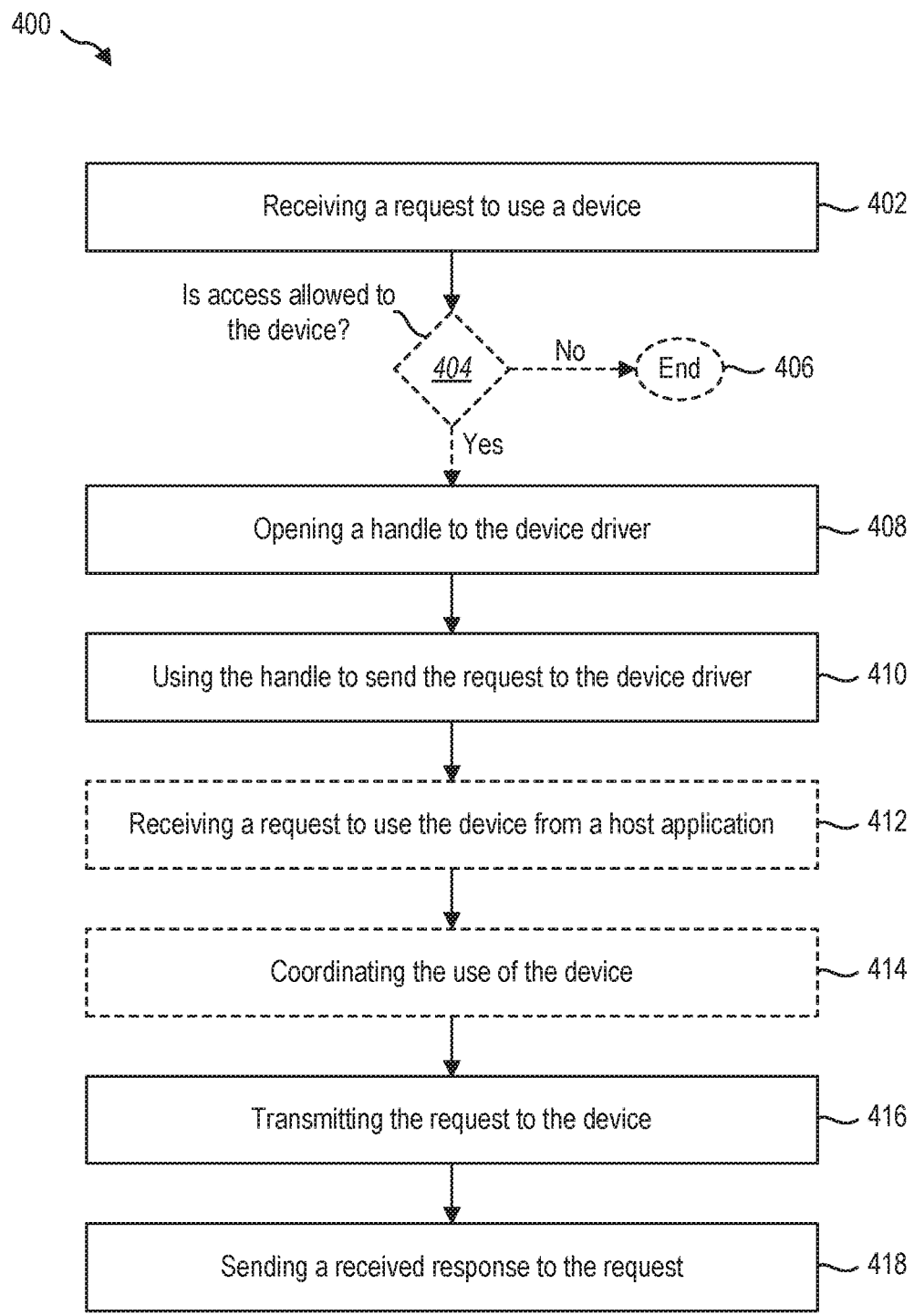
FIG. 4 is a flow diagram of an example method for providing access to one or more devices in accordance with an implementation.

Referring now to FIG. 4, an example method 400 may be used by host device 104 (FIG. 1) to provide access to one or more devices 16 hosted by host device 104. The actions of method 400 may be discussed below with reference to the architecture of FIG. 1.

At 402, method 400 may include receiving a request to use a device. Host partition service component 12 may receive one or more I/O requests from redirection driver 22. The I/O request may include request metadata, such as, but not limited to, application information, user identity, device information, and/or guest device information. Host partition service component 12 may use the request metadata to identify the corresponding device 16 for the selected proxy device 24. For example, the request metadata may be used to map the proxy device 24 to the corresponding device 16.

At 404, method 400 may optionally include determining whether to provide access to the device. Host partition service component 12 may perform an access control to device 16. For example, host partition service component 12 may apply one or more rules or heuristics to determine whether guest device 106 and/or application 20 may access device 16. Host partition service component 12 may use the request metadata information associated with the I/O request to determine whether to provide guest device 106 and/or application 20 access to device 16 for the I/O request. An example rule may include a web camera may allow guest access to the web camera when guest applications are compatible applications with the web camera. Host partition service component 12 may use the request metadata to perform a verification that application 20 is the operating specific application prior to sending the I/O request to device driver 14. Another example rule may include a device that may have an access policy from guest applications based on guest container type (e.g., allow access from applications within a virtual machine (VM) container providing compatibility with other operating systems and block access from applications within a more secure locked-down VM contain). Another example rule may include requiring user consent for an application to access device 16. Host partition service component 12 may use the request metadata to perform a verification that the guest device 106 is an allowed container type before transmitting the I/O request to device driver 14.

In an implementation, the access control to device 16 may also be performed by device driver 14. For example, device driver 14 may apply one or more rules to determine whether to provide the guest device 106 and/or applications 20 access to device 16.

At 406, method 400 may end in response to determining access is not allowed to the device. For example, if host partition service component 12 determines that access to device 16 may not be provided to guest device 106 and/or application 20, method 400 may end.

At 408, method 400 may include opening a handle to a device driver for the device. Host partition service component 12 may open a handle to device driver 14 associated with the identified device 16 in response to determining that access to device 16 may be provided to guest device 106 and/or applications 20.

At 410, method 400 may include using the handle to send the request to the device driver. Host partition service component may transmit the I/O requests to device driver 14.

At 412, method 400 may optionally include receiving a request to use a device from a host application. For example, device driver 14 may receive requests from one or more applications 10 operating on host device 104 to use, or otherwise access, one or more devices 16.

At 414, method 400 may optionally include coordinating the use of the device. Device driver 14 may coordinate use of devices 16. For example, device driver 14 may receive one or more requests from applications 10 operating on host device 104 to use devices 16 and may receive one or more I/O requests from host partition service component 12 to use devices 16. Device driver 14 may be unaware of whether the requests originated from an application 10 running on host device 104 or an application 20 running on a guest device 106 and may coordinate the access to device 16 to both applications 10 and applications 20. As such, devices 16 may be simultaneously available for use by applications 10 running on host device 104 while also projected and accessible by applications 20 in multiple guest devices 106.

At 416, method 400 may include transmitting the request to the device. Device driver 14 may transmit the requests (e.g., requests from applications 10 and/or I/O requests from host partition service component 12) to device 16.

At 418, method 400 may include sending a received response to the requests. Device 16 may perform one or more operations in response to the requests and may provide a response to the requests. Device driver 14 may communicate the response to applications 10 and/or host partition service component 12. Host partition service component 12 may send the response to redirection driver 22.

Figure 5:
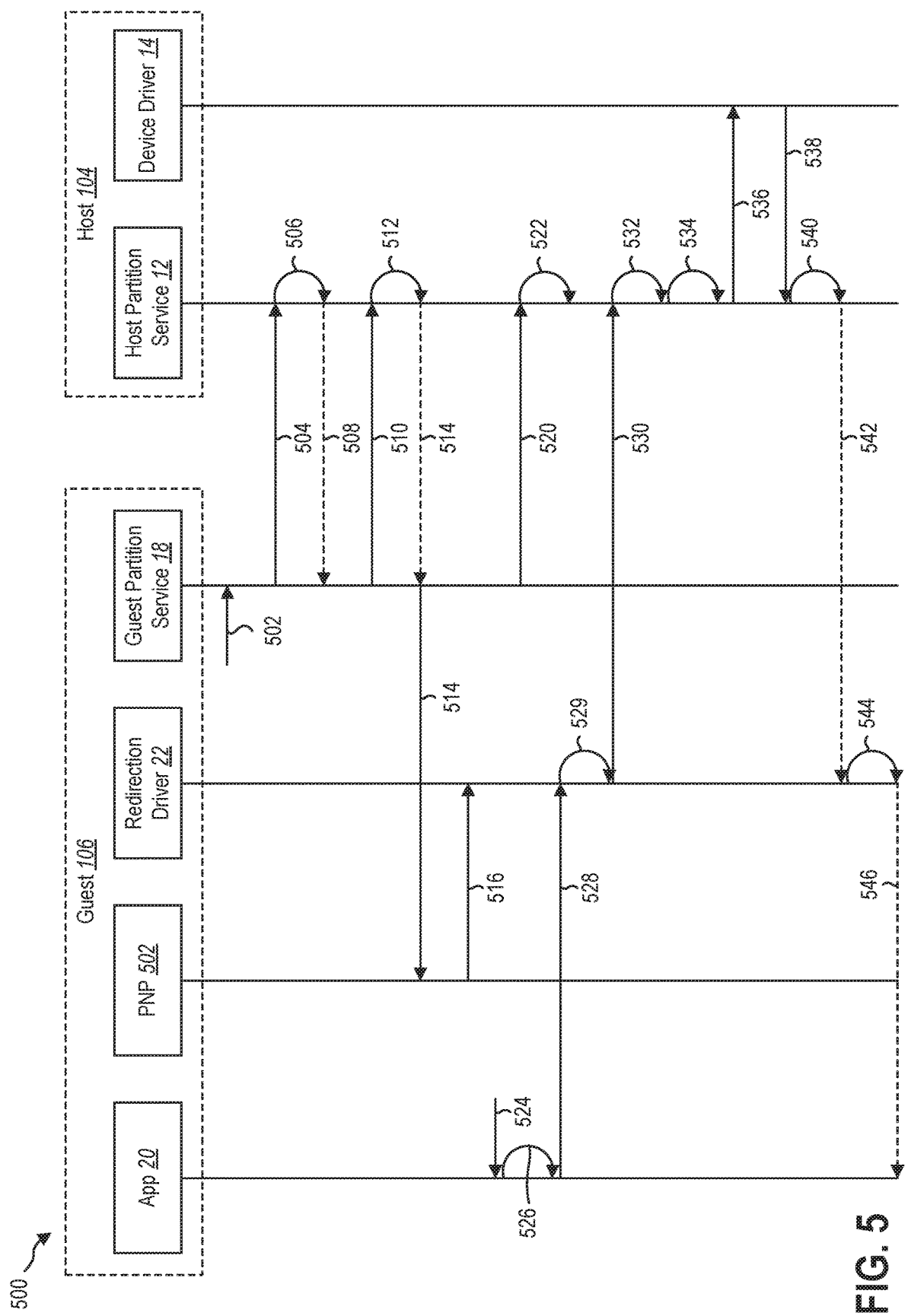
FIG. 5 is a flow diagram of an example message flow for opening and discovering devices in accordance with an implementation.

Referring now to FIG. 5, an example method 500 shows a message flow interaction between guest device 106 and host device 104 for opening and discovering devices. Guest device 106 may include an application 20, a Plug and Play (PnP) device 502, a redirection driver 22, and a guest partition service component 18. Host device 104 may include a host partition service component 12 and a device driver 14. The actions of method 500 may be discussed below with reference to the architecture of FIG. 1.

At 502, guest partition service component 18 may receive a start request. At 504, guest partition service component 18 may send a request to host partition service component 12 to create a session using a communication channel. In an implementation, the request to create a session may be sent using a remote procedure call (RPC). At 506, host partition service component 12 may create a context handle and assign a session handle for the session. The context handle may allow guest device 106 to identify the state of host device 104. At 508, host partition service component 12 may optionally send a session created response to guest partition service component 18.

At 510, guest partition service component 18 may send a request for device status, and at 512, host partition service component 12 may generate a list of all device interface and status updates. The device status request may be for a newly attached device on host device 104, for all devices connected to host device 104, or a portion or subset of devices connected to host device 104. At 514, method 500 host partition service component 12 may send the list of device interfaces and status updates. The list of all device interface and status updates may optionally be sent to guest partition service component 18. Guest partition service component 18 may use bus driver 26 (FIG. 1) to create and/or update proxy devices 24 (FIG. 1) in response to receiving the list of device and status updates.

At 516, PnP device 502 may load a redirection driver service. The redirection driver 22 may provide an interface for application 20 to communicate with device 16 through host partition service component 12. At 520, guest partition service component 18 may request a device status. The guest partition service component 18 may send a request for the device status to host partition service component 12. In an implementation, the request may be an RPC request. At 522, host partition service component 12 may hold the request in context until receiving an interface or status update from a device.

At 524, application 20 may launch. At 526, application 20 may enumerate local device interfaces. At 528, application 20 may send a create file request to redirection driver 22. At 529, redirection driver 22 may look up session and device handle. At 530, redirection driver 22 may connect to host partition service component 12 and send a request to open a device. In an implementation, redirection driver 22 may use a RPC connection to send the request to open a device.

At 532, host partition service component 12 may create a context handle for device associated with the session. At 534, host partition service component 12 may perform permission checks. At 536, host partition service component 12 may send a request to device driver 14 to create a local file. At 538, device driver 14 may send a success notification to host partition service component 12. At 540, host partition service component 12 may add a handle to the context for the session. At 542, host partition service component 12 may optionally send a device open response to redirection driver 22. At 544, redirection driver 22 may assign a remote handle to a local file context. At 546, redirection driver 22 may optionally send a create file return to application 20.

Figure 6:
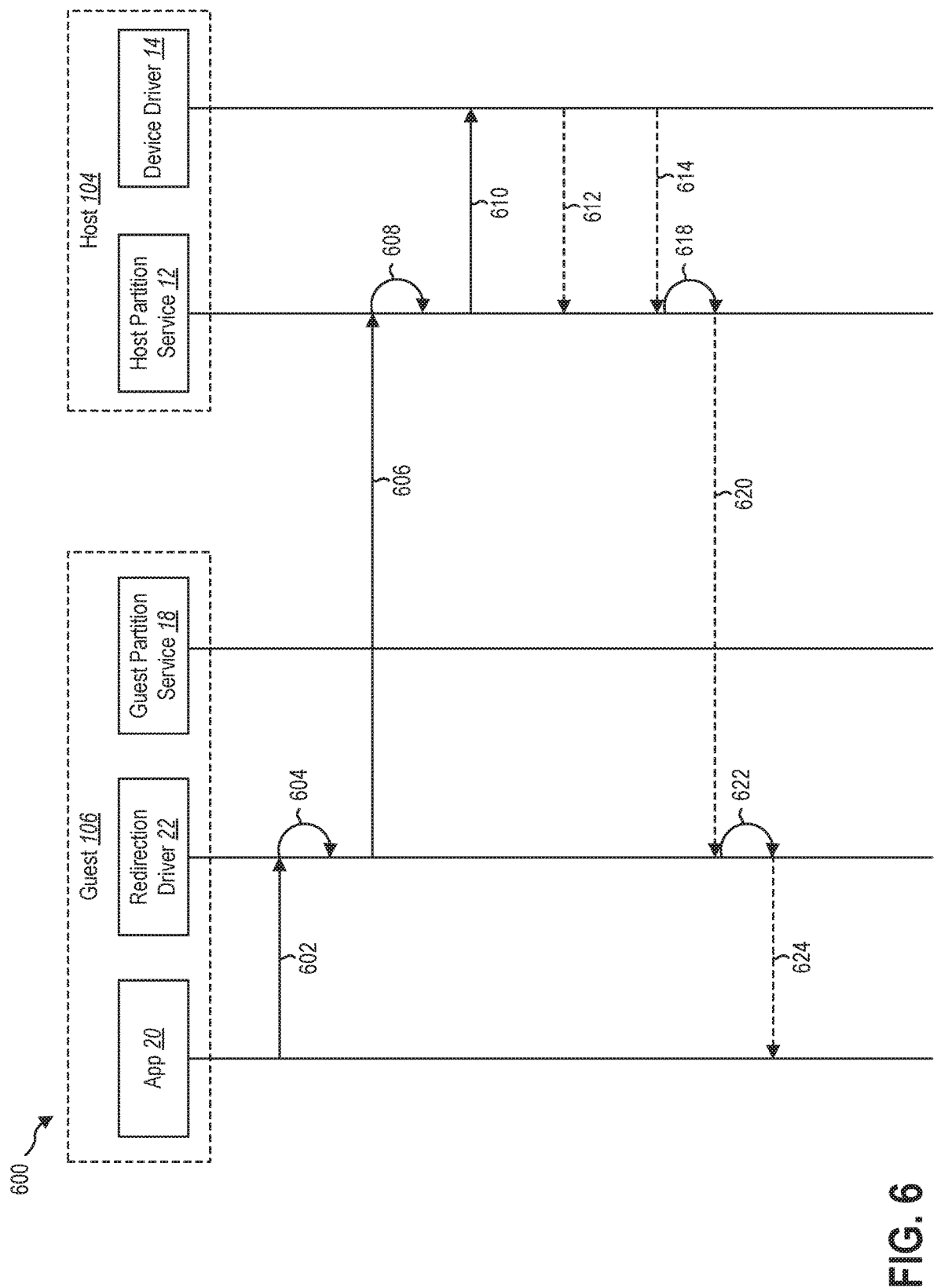
FIG. 6 is a flow diagram of an example message flow for performing input/output operations on a device in accordance with an implementation.

Referring now to FIG. 6, an example method 600 shows a message flow interaction between guest device 106 and host device 104 for performing input/output operations on a device 16 (FIG. 1). Guest device 106 may include an application 20, a redirection driver 22, and a guest partition service component 18. Host device 104 may include a host partition service component 12 and a device driver 14. The actions of method 600 may be discussed below with reference to the architecture of FIG. 1.

At 602, application 20 may send an input/output request to redirection driver 22 using a file handle. At 604, redirection driver 22 may place the input/output request in a processing queue and may issue a get input/output status call. At 606, redirection driver 22 may send a request for the input/output to host partition service component 12. In an implementation, the request may be a RPC request.

At 608, host partition service component 12 may validate the handle, increment a local pending input/output reference count, and add the input/output request to a queue. At 610, host partition service component 12 may send the input/output request to device driver 14.

At 612, device driver 14 may send a pending notification to host partition service component 12. At 614, device driver 14 may send a complete notification to host service component 12 when the input/output request is completed. At 618, host partition service component 12 may remove the input/output request from the queue and update the input/output reference count. At 620, host partition service component 12 may send an input/output response to redirection driver 22. At 622, redirection driver 22 may remove the input/output request from the queue. At 624, redirection driver 22 may send a notification to application 20 indicating that the input/output request is complete. The notification may include the input/output response from the host partition service component 12.

Figure 7:
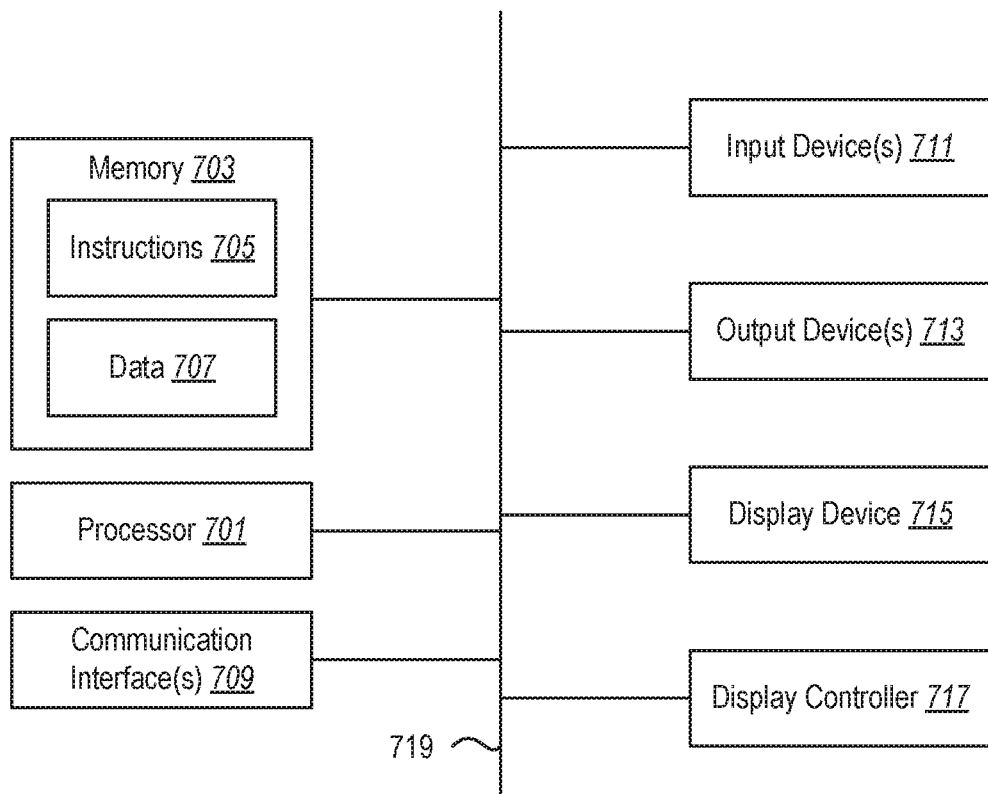
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A host device, comprising:
a memory; and
at least one processor, wherein the host device hosts a guest device operable to:
receive, from the host device, a notification with information for at least one device in communication with the host device;
use the information for the at least one device to select, from a plurality of generated proxy devices in the guest device, a proxy device in the guest device that supports input/output redirection, wherein the proxy device is a duplicative device that is compatible with the at least one device and provides the guest device with full access functionality to the host device;
load, in response to determining that the proxy device supports input/output redirection, an input/output redirection driver for the proxy device to communicate with the host device; and
redirect, using the input/output redirection driver, input/output requests received from an application in the guest device to the host device.

2. The host device of claim 1, wherein the guest device is further operable to:
apply one or more rules for determining whether to create the proxy device; and
generate the proxy device in response to determining to create the proxy device.

3. The host device of claim 1, wherein in the information includes metadata.

4. The host device of claim 1, wherein the notification is received in response to the host device applying at least one rule for determining whether to project the at least one device in the guest device.

5. The host device of claim 4, wherein the at least one rule includes one or more of identifying supported device types, identifying supported device classes, identifying whether devices opted in to projection into the guest device, identifying whether devices opted out of projection into the guest device, providing a list of devices to project into the guest device, or providing a list of devices to prevent projection into the guest device.

6. The host device of claim 1, wherein the guest device is further operable to:
identify the proxy device to use for an input/output request associated with an application running on the guest device;
use the input/output redirection driver to send the input/output request to the host device; and
receive an input/output response from the host device in response to the at least one device performing one or more operations for the input/output request.

7. The host device of claim 6, wherein the host device is further operable to:
receive the input/output request from the input/output redirection driver;
open a handle to a driver associated with the at least one device corresponding to the proxy device; and
send the input/output request to the driver for the at least one device to perform one or more operations for the input/output request and generate the input/output response.

8. The host device of claim 7, wherein the host device is further operable to:
perform an access control verifying access to the at least one device from the guest device;
send the input/output request to the driver in response to determining the guest device has access to the at least one device; and
block the input/output request to the driver in response to determining the guest device is unable to access the at least one device.

9. The host device of claim 7, wherein the host device is further operable to:
provide a host application running on the host device access to the at least one device in response to receiving a request from the host application to use the at least one device.

10. The host device of claim 9, wherein the host device is further operable to coordinate between the host application and the application running on the guest device the access to the at least one device.

11. A method executed on a computer device with a host device in communication with a guest device, comprising:
receiving, from the host device, a notification with information for at least one device in communication with the host device;
using the information for the at least one device to select, from a plurality of generated proxy devices in the guest device, a proxy device that supports input/output redirection and is a duplicative device that is compatible with the at least one device and provides the guest device with full access functionality to the host device;
loading, in response to determining that the proxy device supports input/output redirection, an input/output redirection driver in the guest device for the proxy device to communicate with the host device; and
redirecting, using the input/output redirection driver, input/output requests received from an application in the guest device to the host device.

12. The method of claim 11, further comprising:
applying one or more rules for determining whether to create the proxy device; and
generating the proxy device in response to determining to create the proxy device.

13. The method of claim 11, wherein the notification is received in response to determining to project the at least one device into the guest device using at least one rule.

14. The method of claim 13, wherein the at least one rule includes one or more of identifying supported device types, identifying supported device classes, identifying whether devices opted in to projection into the guest device, identifying whether devices opted out of projection into the guest device, providing a list of devices to project into the guest device, or providing a list of devices to prevent projection into the guest device.

15. The method of claim 11, further comprising:
identifying the proxy device to use for an input/output request associated with an application running on the guest device;
using the input/output redirection driver to send the input/output request to the host device; and
receiving an input/output response from the host device in response to the at least one device performing one or more operations for the input/output request.

16. The method of claim 15, further comprising:

receiving, by the host device, the input/output request from the input/output redirection driver;

opening, by the host device, a handle to a driver associated with the at least one device corresponding to the proxy device; and sending, by the host device, the input/output request to the driver for the at least one device to perform one or more operations for the input/output request and generate the input/output response.

17. The method of claim 16, further comprising:

performing, by the host device, an access control verifying access to the at least one device from the guest device;

sending, by the host device, the input/output request to the driver in response to determining the guest device has access to the at least one device; and blocking, by the host device, the input/output request to the driver in response to determining the guest device is unable to access the at least one device.

18. The method of claim 16, further comprising:

providing, at the host device, a host application running on the host device access to the at least one device in response to receiving a request from the host application to use the at least one device.

19. The method of claim 18, further comprising:

coordinating, at the host device, the access to the at least one device between the host application and the application running on the guest device.

20. A non-transitory computer-readable medium storing instructions executable by a computer device, comprising:

at least one instruction for causing the computer device to receive, from a host device, a notification with information for at least one device in communication with the host device;

at least one instruction for causing the computer device to use the information for the at least one device to select, from a plurality of generated proxy devices in a guest device, a proxy device in the guest device that supports input/output redirection, wherein the proxy device is a duplicative device that is compatible with the at least one device and provides the guest device with full access functionality to the host device;

at least one instruction for causing the computer device to load, in response to determining that the proxy device supports input/output redirection, an input/output redirection driver in the guest device for the proxy device to communicate with the host device; and at least one instruction for causing the computer device to redirect, using the input/output redirection driver, input/output requests received from an application in the guest device to the host device.

* * * * *